(12) United States Patent
Yang (10) Patent No.: US 9,602,922 B1
(45) Date of Patent: Mar. 21, 2017

(54) ADAPTIVE ECHO CANCELLATION

(71) Applicant: Amazon Technologies, Inc., Seattle, WA (US)

(72) Inventor: Jun Yang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 13/929,588

(22) Filed: Jun. 27, 2013

(51) Int. Cl.
| H04R 3/02 | (2006.01) |
| H04R 3/00 | (2006.01) |
| H04M 1/60 | (2006.01) |
| H04M 3/00 | (2006.01) |
| H04M 9/08 | (2006.01) |
| H04B 3/23 | (2006.01) |

(52) U.S. Cl.
CPC ............ *H04R 3/002* (2013.01); *H04B 3/237* (2013.01); *H04M 1/6033* (2013.01); *H04M 9/082* (2013.01); *H04M 3/002* (2013.01); *H04R 3/005* (2013.01)

(58) Field of Classification Search
CPC .... H04M 9/082; H04M 1/6033; H04M 3/002; H04M 9/08; H04R 3/005; H04R 3/02; H04B 3/23; H04B 3/237
USPC .......................................................... 381/66
See application file for complete search history.

(56) References Cited

U.S. PATENT DOCUMENTS

| 5,649,012 | A  | * | 7/1997  | Gupta et al. ............ 379/406.09 |
| 7,418,392 | B1 |   | 8/2008  | Mozer et al. |
| 7,720,683 | B1 |   | 5/2010  | Vermeulen et al. |
| 7,774,204 | B2 |   | 8/2010  | Mozer et al. |
| 2003/0092473 | A1 | * | 5/2003 | Kosanovic et al. ........... 455/570 |
| 2006/0034447 | A1 | * | 2/2006 | Alves .................... H04M 9/082 379/406.01 |
| 2007/0025282 | A1 | * | 2/2007 | Suppappola et al. ......... 370/289 |
| 2012/0223885 | A1 |   | 9/2012 | Perez |
| 2013/0301847 | A1 | * | 11/2013 | Alderson ........... G10K 11/1784 381/71.11 |

FOREIGN PATENT DOCUMENTS

WO     WO2011088053 A2     7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Davetta W Goins
*Assistant Examiner* — Daniel Sellers
(74) *Attorney, Agent, or Firm* — Lee & Hayes, PLLC (57) ABSTRACT

An audio-based system may perform echo cancellation using first and second adaptive filters. An adaptation controller may be configured to control whether and/or how the filter coefficients of the first adaptive filter are updated, based on detected filter divergence, echo path changes, and/or presence of near-end user voice. The parameters of the second adaptive filter may be copied from the first adaptive filter under certain conditions that indicate whether copying the parameters would be likely to improve echo suppression.

20 Claims, 4 Drawing Sheets

ADAPTIVE ECHO CANCELLATION

BACKGROUND

Acoustic echo cancellation (AEC) is used in telecommunications devices to improve audio quality. In this environment, an echo is a delayed reoccurrence of an original signal in a received or retransmitted signal.

Audio echo may be caused by an acoustic echo path between the microphone and speaker of a communications device such as a telephone handset. AEC is particularly useful in so-called "hands-free" communications devices, where there is very little acoustic isolation between the microphone and speaker of the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for acoustic echo cancellation. In certain embodiments, a first adaptive filter estimates an echo component of an input audio signal based on a set of filter coefficients. Under certain conditions, the filter coefficients are updated dynamically and continuously. Under other conditions, the filter coefficients may be reset or temporarily frozen. Certain conditions may also cause the filter coefficients to be updated at an increased rate.

In certain embodiments, an adaptation controller may be configured to control whether and/or how the filter coefficients of the first adaptive filter are updated. The adaptation controller calculates or receives indications relating to filter divergence, echo path changes, and the presence of near-end audio or double talk. When the adaptive filter is exhibiting divergence, the adaptation controller resets the filter coefficients to their nominal or initialization values. If the adaptive filter is not diverging, but there is a detected change in one or more acoustic echo paths, the adaptation controller allows the adaptive filter to update its coefficients normally or at an increased update rate. If there is no divergence and no detected change in acoustic echo paths but near-end audio or double talk is detected, the adaptation controller freezes the coefficients of the first adaptive filter. When there is no divergence, no detected changing of acoustic echo paths, and no detected double talk, the first adaptive filter is allowed to update its coefficients normally, at a default update rate.

A second adaptive filter may be used to generate an estimated echo signal representing the echo component of the input audio signal, based on filter coefficients that are copied from the first adaptive filter. The echo signal generated by the second adaptive filter is subtracted from the input audio signal to generate an echo-suppressed audio signal.

A transfer controller may be used to determine when to copy coefficients from the first adaptive filter to the second adaptive filter, based on evaluations of various signal energies. Generally, the transfer controller evaluates whether echo reduction would be improved by updating the coefficients of the second adaptive filter, and allows the coefficients to be copied from the first adaptive filter only when doing so would be likely to improve the overall echo return loss enhancement.

Figure 1:
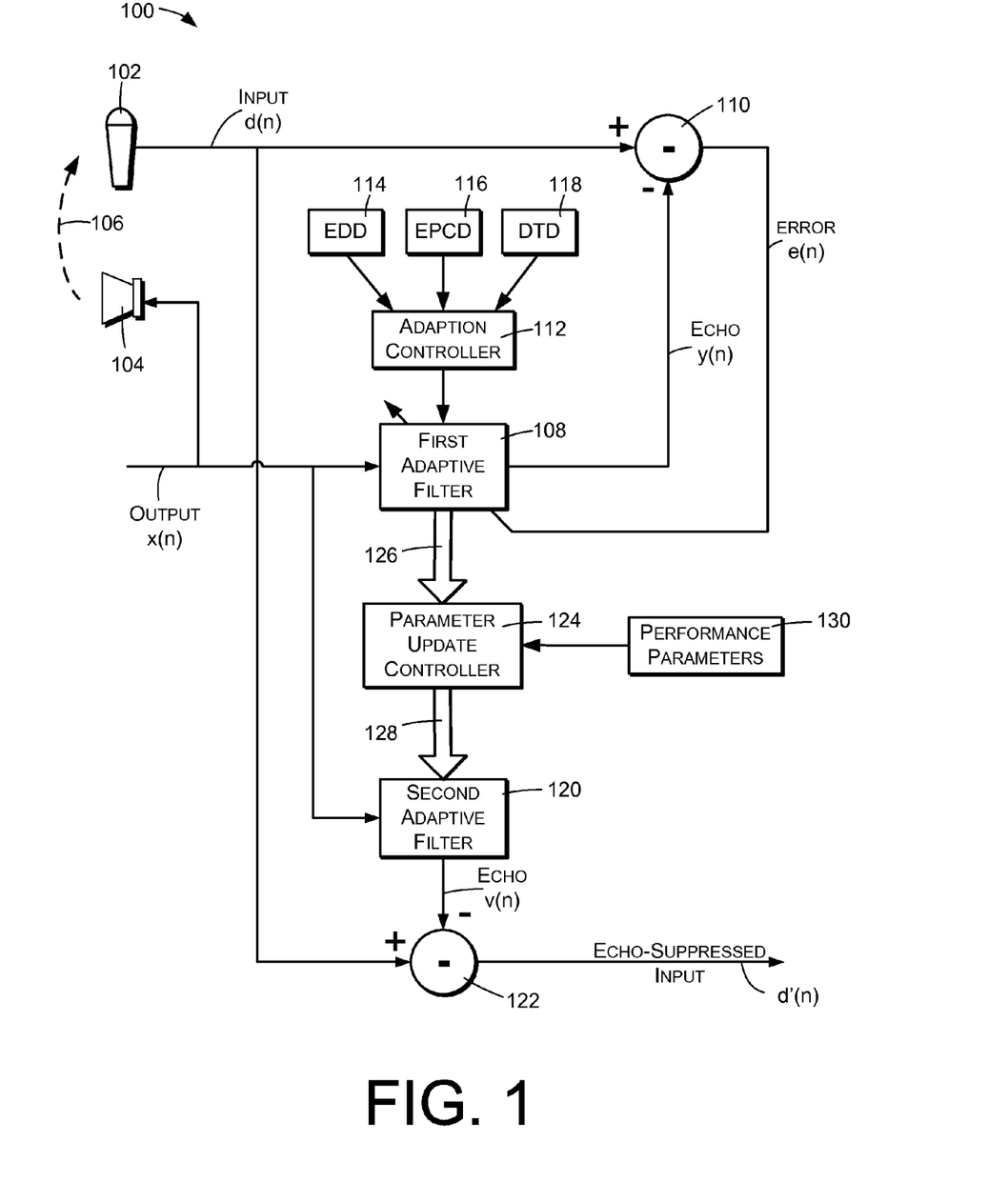
FIG. 1 is a block diagram illustrating a system and method for acoustic echo suppression or cancellation.

FIG. 1 shows an example system 100 having an audio microphone 102 and an audio speaker 104 that are coupled by one or more echo paths 106. The voice of a user is captured by the microphone 102, which provides or generates a transmit-path input audio signal d(n). The speaker 104 produces audio in response to a receive-path output audio signal x(n).

The audio produced by the speaker 104 may be picked up by the microphone 102 because of the echo paths 106. The input audio signal d(n) may therefore include one or more components of the receive-path output audio signal x(n), as a result of audio propagation over the echo paths 106. These components of the receive-path output audio signal x(n) are referred to as echoes or echo components. The purpose of the system 100 is to suppress or remove the echo or echo components from the transmit-path input audio signal d(n) and to produce an echo-suppressed audio signal d'(n).

The audio signals shown and discussed herein are assumed for purposes of discussion to be digital signals, comprising continuous sequences of digital amplitude values. The nomenclature "c(n)" indicates the $n^{th}$ value a sequence c of digital amplitude values.

Audio received from the microphone 102 may be evaluated in the time domain at a predetermined sampling rate to produce sampled amplitude values. In addition, time domain audio signals may be converted to frequency domain signals or values for certain types of processing and filtering that will be discussed below.

The system 100 may be used within an audio device or system to suppress or cancel echo components of an input audio signal. As an example, the system 100 may be used within a near-end audio input/output device for a telephone, cellular phone, or other communications device. As another example, the system 100 may be used within an interface device that facilitates speech-based interactions with a computerized system. For example, such an interface device may receive audio containing spoken user commands and may provide the audio or commands to an automated service or system. The interface device may also produce audio, including generated speech, based on signals or information received from such an automated service or system. In some cases, an interface device such as this may be used for playing content such as music, podcasts, and so forth.

The system 100 may include a first or primary adaptive filter 108 that is configured to estimate or produce a first estimated echo signal y(n) representing one or more echo components of the input audio signal d(n), based at least in part on a plurality of dynamically updated filter parameters. A subtraction component 110 subtracts the first estimated echo signal y(n) from the input audio signal d(n) to produce a first echo-suppressed audio signal, which is also referred to in this context as an error signal e(n). The error signal e(n) is evaluated by the first adaptive filter 108 when updating its filter parameters.

In the described embodiment, the first adaptive filter 108 comprises a linear adaptive finite impulse response (FIR) filter. The first adaptive filter 108 receives the receive-path output audio signal x(n), which comprises amplitude values that are used to drive the speaker 104. In some cases, a delay element (not shown) may be used to delay the x(n) signal prior to providing the x(n) signal to the first adaptive filter 108. Such a delay element may be configured to account for delays introduced by digital-to-analog conversion at the speaker 104, distance between the speaker 104 and the microphone 102, analog-to-digital conversion at the microphone 102, and various buffering and processing activities that may be present in the path from the receive-path output audio signal x(n) to the transmit-path input audio signal d(n).

The filter parameters of the first adaptive FIR filter 108 comprise coefficients or weights that the first adaptive filter 108 applies respectively to the receive-path output audio signal x(n) to create the estimated echo signal y(n). The first adaptive FIR filter 108 receives the error signal e(n) and continuously optimizes the filter parameters so as to continuously and adaptively minimize the signal power of the error signal e(n). The optimization of the filter parameters may be performed using a normalized least mean square algorithm or a total least square algorithm.

In the described embodiment, an adaptation controller 112 is used to control when and/or how the parameters of the first adaptive filter are adaptively updated. Generally, the adaptation controller 112 specifies one of four update behaviors:

(a) The filter parameters are updated at a normal or default update rate;
(b) The filter parameters are updated at an increased update rate, where the increased update rate is higher than the default update rate;
(c) The filter parameters are reset to their default or initialization values; or
(d) Updating is temporarily stopped or disabled, and the filter parameters are frozen at their current values.

The adaptation controller 112 specifies one of these behaviors based on conditions indicated by an echo divergence detection (EDD) component 114, an echo path change detection (EPCD) component 116, and a double-talk detection (DTD) component 118.

The EDD component 114 is configured to detect divergence in the parameters of the first adaptive filter 108, such as may be caused by sudden movements of microphones, speakers, objects, or people. The EDD component may be configured to indicate whether the first adaptive filter 108 is diverging or converging. The filter 108 and the parameters of the filter 108 are said to be converging when the parameters are at or are moving toward stable, relatively non-varying values as a result of being repetitively update. For example, the parameters may change by decreasing amounts with each update until converging on non-changing values. The parameters are said to be diverging when they are not converging, such as when the parameters are moving away from stable values and continue to change over successive parameter updates.

The EPCD component 116 is configured to detect changes in the one or more echo paths 106. Echo paths may change when a user moves relative to the microphone 102 or when other objects, including the device that incorporates the microphone 102 and speaker 104, are moved. The EPCD component 116 may be configured to indicate whether the echo paths are stable and not changing, or whether one or more echo paths are changing or unstable.

The DTD component 118 is configured to detect near-end user voice or double talk in the input audio signal d(n). Near-end "talk" refers to audio that is generated in or received from the environment of the microphone 102, and may include the voice of a user. The term "near-end user voice" is used herein to indicate near-end audio representing the voice of a user.

The robust DTD component 118 may be configured to indicate whether or not near-end user voice is present in the input audio signal d(n). This is in contrast to conventional DTD systems that typically indicate whether or not near-end audio is detected in the input audio signal d(n). Near-end audio may include background or environmental noise in addition to user speech.

"Far-end audio" refers to sound generated in response to the receive-path output audio signal x(n). In two-way telecommunications environments, the far-end audio may comprise the voice of a remote user, which is to be rendered locally by the speaker 104. In other environments, far-end audio may comprise music, speech, or other audio generated by the speaker 104. Far-end audio is often referred to as far-end "talk," particularly in voice communications systems.

"Double talk" refers to a situation in which both far-end audio and near-end user voice are picked up by the microphone 102.

Figure 2:
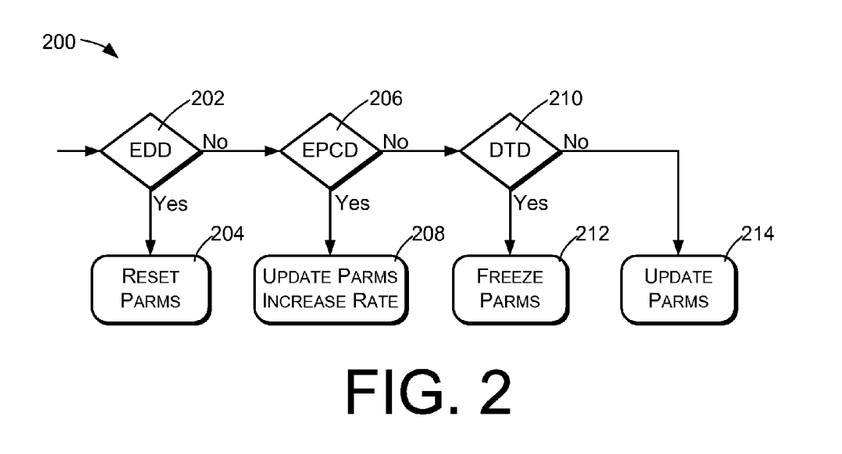
FIG. 2 is a flowchart illustrating conditions that control updating of certain parameters used by the system of FIG. 1.

FIG. 2 shows an example 200 of how the adaptation controller 112 may be configured to control parameter updating of the first adaptive filter 108. An action 202 comprises detecting divergence of the first adaptive filter 108 and/or the filter parameters of the first adaptive filter 108, using echo divergence detection (EDD). If the parameters of the first adaptive filter 108 are diverging, an action 204 is performed of resetting the filter parameters to their nominal, default, or initialization values.

If the parameters of the first adaptive filter are not diverging, an action 206 is performed of detecting changes in the one or more echo paths 106 using echo path change detection (EPCD). If one or more echo path changes are detected, an action 208 is performed comprising either continuing to update the filter parameters at their default rate or increasing the update rate of the filter parameters.

If there is no detected change in echo paths, an action 210 is performed of detecting double talk or near-end user voice in the input audio signal d(n). If near-end user voice is present, an action 212 is performed comprising disabling filter parameter updating and thereby freezing the values of the filter parameters at their current values. If near-end user voice is not present, an action 214 is performed comprising continuing to update the filter parameters at the default update rate.

The update control scheme illustrated by FIG. 2 can be alternatively stated as follows:
  If the parameters of the first adaptive filter are diverging, the filter parameters are reset;
  If the parameters of the first adaptive filter are not diverging and an echo path change is detected, the filter parameters continue to be updated at their default rate or at an increased rate;
  If the parameters of the first adaptive filter are not diverging, the echo paths are stable (i.e., no echo path change is detected), and near-end user voice is detected in the input audio signal, the filter parameters are frozen—dynamic updating is stopped and the parameters are held at their current values; or If the parameters of the first adaptive filter are not diverging, echo paths are stable (i.e., no echo path change is detected), and near-end user voice is not detected in the input audio signal, the filter parameters continue to be updated at their default rate.

Returning to FIG. 1, the system 100 may include a second or secondary adaptive filter 120. The second adaptive filter 120 may be configured to estimate and/or produce a second estimated echo signal v(n) representing the one or more echo components of the transmit-path input audio signal d(n) based in part on the receive-path output audio signal x(n). As described above, a delay element (not shown) may be used to delay the x(n) signal prior to providing the x(n) signal to the second adaptive filter 120.

A subtraction component 122 subtracts the second estimated echo signal v(n) from the input audio signal d(n) to produce the echo-suppressed audio signal d'(n), which is the echo-suppressed version of the transmit-path input audio signal d(n).

Instead of calculating and updating its own filter parameters, the second adaptive filter receives its filter parameters from the first adaptive filter 108, under the control of a parameter update controller 124. For purposes of discussion, the parameters of the first adaptive filter 108 are referred to by the reference numeral 126. The parameters of the second adaptive filter 120 are referred to by the reference numeral 128.

The second adaptive filter 120 may comprise a linear adaptive finite impulse response (FIR) filter, and the filter parameters of the second adaptive filter 120 may comprise FIR coefficients or weights. The parameter update controller 124 is configured to copy or transfer the parameters 126 of the first adaptive filter 108 for use as FIR coefficients or weights 128 of the second adaptive filter 120 under certain conditions. Generally, the conditions relate to whether or not updating the FIR parameters 128 of the second adaptive filter 120 would be likely to result in improved echo suppression, as indicated by one or more performance parameters or factors 130. In some embodiments, the parameter update controller 124 may be configured to continuously and repetitively update the parameters of the second adaptive filter 120 when the performance parameters 130 have satisfied certain conditions for a predetermined amount of time (e.g. 50 milliseconds). When the specified conditions are not satisfied, the parameter update controller 124 does not update the parameters of the second adaptive filter 120, and the second adaptive filter 120 continues to use its existing filter parameters. The second adaptive filter 120 does not optimize or update its own filter parameters, other than by receiving updated filter parameters that are copied from the first adaptive filter 108.

The functionality illustrated by FIG. 1 may be implemented by various types of logic, including digital processors, signal processors, or similar types of devices that perform operations based on instructions and/or programs stored in associated memory. In other embodiments, the described functionality may be performed by other means, which may include non-programmable elements such as analog components, discrete logic elements, and so forth.

Figure 3:
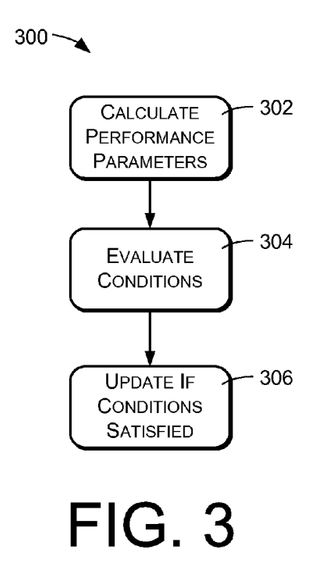
FIG. 3 is a flowchart illustrating an example method of updating certain parameters used by the system of FIG. 1.

FIG. 3 shows an example method 300 that may be implemented by the parameter update controller 124 to update the filter parameters 128 of the second adaptive filter 120. An action 302 may comprise calculating one or more performance parameters. The performance parameters may comprise and/or be based on various signal energies, which may include one or more of the following:

(a) energy of the transmit-path input audio signal d(n);
(b) energy of the receive-path output audio signal x(n);
(c) energy of the echo-suppressed audio signal d'(n);
(d) energy of the first estimated echo signal y(n); or
(e) energy of the second estimated echo signal v(n).

The performance parameters may also comprise and/or be based on one or more energy relationships that are compared to thresholds to determine when to copy filter parameters from the first adaptive filter 108 to the second adaptive filter 120. For example, the performance parameters may include a relationship between the energies of the error signal e(n) and the echo-suppressed audio signal d'(n), such as the energy ratio e(n)/d'(n). As another example, the performance parameters may include a relationship between the energies of the input audio signal d(n) and the error signal e(n), such as the difference d(n)−e(n).

An action 304 may comprise evaluating certain conditions based on the calculated performance parameters. More specifically, the action 304 may comprise comparing the relationships mentioned above to respective thresholds to identify the following conditions:

(a) The receive-path output audio signal x(n) and the transmit-path input audio signal d(n) have energies that are above respective thresholds.
(b) The energy ratio of the error signal e(n) to the echo-suppressed signal d'(n) (e(n)/d'(n)) is smaller than a given threshold.
(c) The energy difference between the input audio signal d(n) and the error signal e(n) (d(n)−e(n)), representing echo return loss enhancement (ERLE) of adaptive filter 108, is greater than a given threshold (e.g. 12 dB).

An action 306 comprises updating the filter parameters 128 of the second adaptive filter 120 when the above conditions are satisfied. In some embodiments, the action 306 may comprise continuously and repetitively updating the filter parameters 128 when the above conditions have been satisfied for a predetermined amount of time (e.g. 50 milliseconds).

Figure 4:
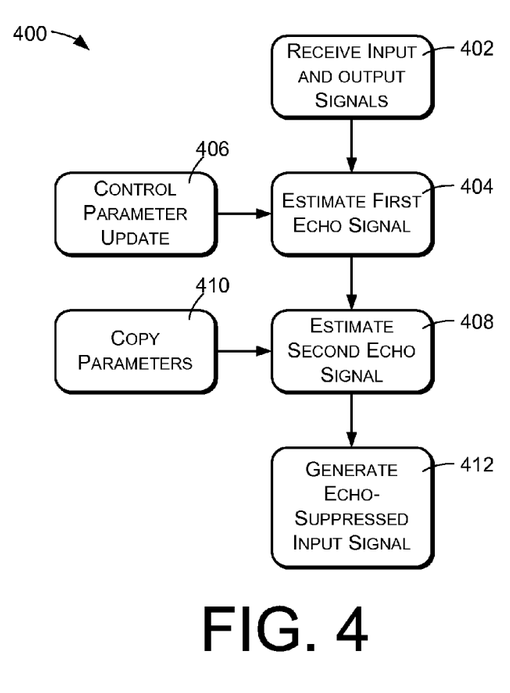
FIG. 4 is a flowchart illustrating an example method of performing acoustic echo suppression.

FIG. 4 shows an example method 400 of acoustic echo suppression, which may be performed by the system of FIG. 1 or in other environments. The term "suppression" as used herein is intended to indicate various efforts that may be employed to reduce the presence of echo components within an audio signal, which may include subtracting or removing an estimate of such echo components from the audio signal to produce an echo-suppressed audio signal.

An action 402 may comprise receiving the receive-path output audio signal x(n) and the transmit-path input audio signal d(n). The receive-path output audio signal x(n) comprises an audio reference signal, containing audio that is produced by the speaker 104. The transmit-path input audio signal d(n) may comprise a signal generated by the microphone 102, which potentially contains reflected or coupled echo components of the speaker output.

An action 404 may comprise estimating or otherwise producing the first estimated echo signal y(n). In the described embodiment this is performed by a first adaptive FIR filter, which may be implemented in the time domain or the frequency domain. The adaptive FIR filter uses a dynamically updated set of parameters, referred to as coefficients or weights, which are applied to the receive-path output audio signal x(n) to produce the first estimated echo signal y(n). The weights are calculated so as to minimize the signal power of the error signal e(n), which comprises the input audio signal d(n) minus the first estimated echo signal y(n).

An action 406 may comprise controlling the updating of the filter parameters used by the adaptive FIR filter. The action 406 may be performed by the adaptation controller 112, in accordance with the scheme described above with reference to FIG. 2. Other schemes may also be used to selectively control how and when the filter parameters of the first adaptive filter 108 are updated.

An action 408 may comprise estimating or otherwise producing the second estimated echo signal v(n). In the described embodiment this is performed by a second adaptive FIR filter, which may be implemented in either the time domain or the frequency domain. The second adaptive FIR filter uses a set of parameters, referred to as coefficients or weights, which are applied to the receive-path output audio signal x(n) to produce the second estimated echo signal v(n).

An action 410 comprises copying the filter parameters of the first adaptive filter 108 to the second adaptive filter 120 under certain conditions, which may be based one or more of the following:
  energy of the transmit-path input audio signal d(n);
  energy of the receive-path output audio signal x(n);
  energy of the echo-suppressed audio signal d'(n);
  energy of the first estimated echo signal y(n); and
  energy of the second estimated echo signal v(n).

The action 410 may in some embodiments be implemented in accordance with the example method 300 of FIG. 3. More generally, the action 410 comprises evaluating whether echo suppression will likely be improved by copying filter parameters from the first adaptive filter 108 to the second adaptive filter 120, and updating the parameters of the second adaptive filter 120 based on the parameters of the first adaptive filter 108 when doing so is likely to improve echo suppression.

An action 412 may comprise generating the echo-suppressed input signal d'(n), based on the second estimated echo signal v(n). More specifically, the action 412 comprises subtracting the second estimated echo signal v(n) from the transmit-path input audio signal d(n).

Figure 5:
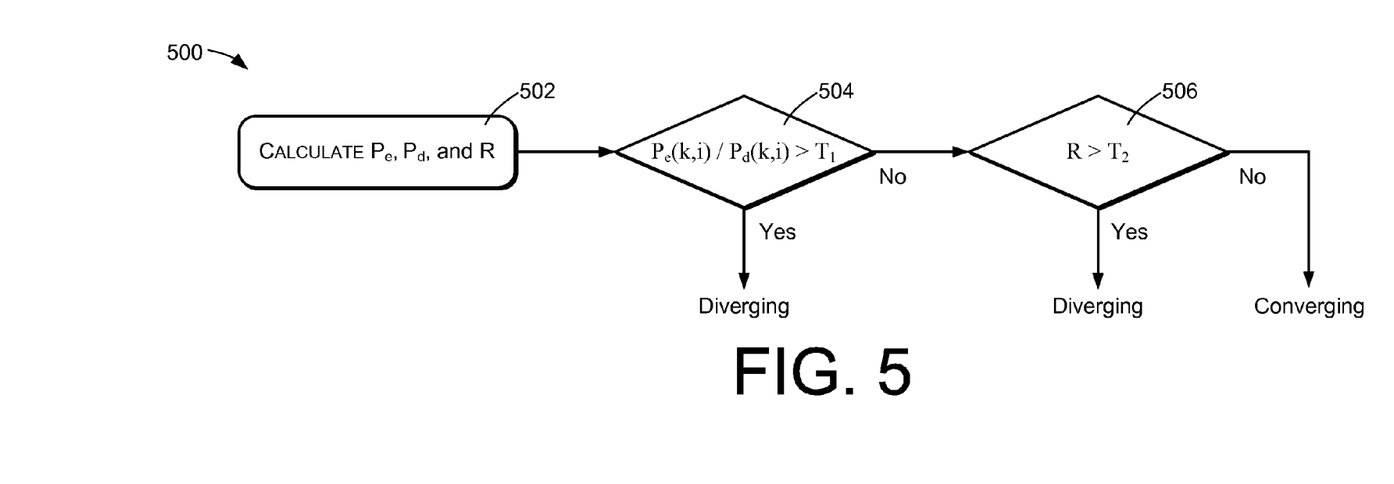
FIG. 5 is a flowchart illustrating an example method of performing echo divergence detection.
Figure 6:
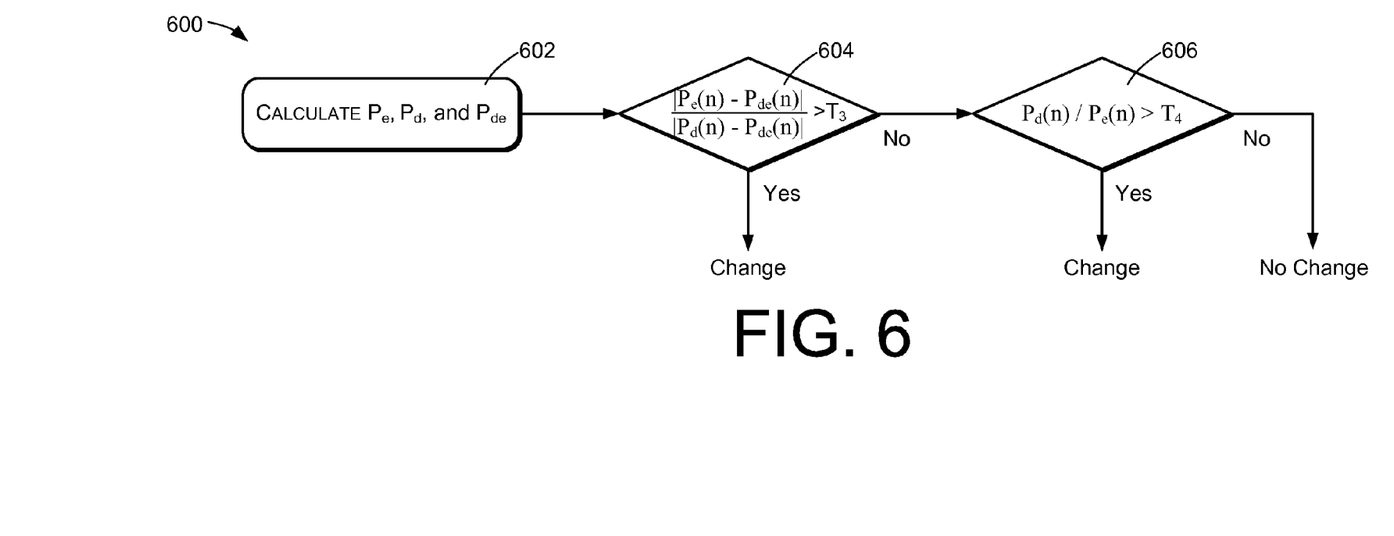
FIG. 6 is a flowchart illustrating an example method of performing echo path change detection.
Figure 7:
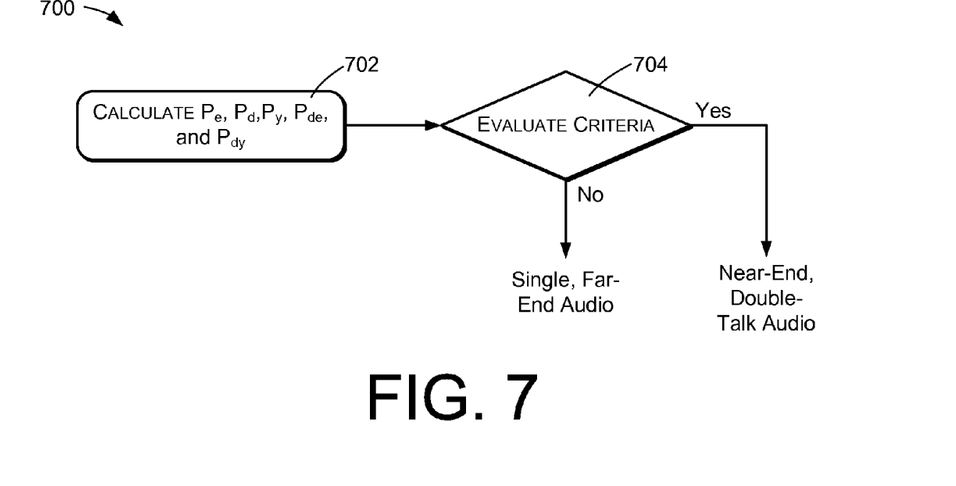
FIG. 7 is a flowchart illustrating an example method of performing double talk detection.

FIGS. 5-7 illustrate example methods that may be implemented by the echo divergence detection (EDD) component 114, the echo path change detection (EPCD) component 116, and the double talk detection (DTD) component 118, respectively. Note that various methods may be used by these components, not limited to the specific methods described below.

The described methods utilize power and cross-power estimations, which may calculated in the frequency domain. An individual time-domain signal, such as any one of the signals d(n), y(n), e(n), v(n), and d'(n), may be converted to a frequency-domain signal by receiving input samples of the time-domain signal, arranging the input samples in frames, and calculating a frequency spectrum for each frame. The frequency spectrum may be calculated using overlapping, Hanning windowing and a fast Fourier transform (FFT). Each frequency spectrum has amplitude values corresponding respectively to multiple discrete frequencies, which are referred to as frequency bins in the FFT context. For example, a signal frequency spectrum may have 128 frequency bins, corresponding to 128 discrete frequencies.

In some embodiments, frequency bins may be converted into a lower number of frequency bands, where each band corresponds to a range of frequency bins. For example, 128 frequency bins may be converted into 30 frequency bands by averaging ranges of corresponding frequency bins. Partitioning frequency bins into frequency bands can greatly reduce computational complexity and memory usage. For purposes of discussion, the term "bin" will be used to refer to either a frequency bin or band.

FIG. 5 illustrates an example method 500 that may be performed by the echo divergence detection (EDD) component 114. An action 502 comprises calculating the smoothed power of the transmit-path input audio signal d(n), the smoothed power of the error signal e(n), and a ratio or percentage R that is based on the number of filter coefficients of the first adaptive filter 108 that exceed a given threshold.

The smoothed power of e(n) can be calculated in accordance with Equation (1):

$$P_e(k,i)=(1-\alpha) \times P_e(k-1,i)+\alpha \times e^2(k,i) \qquad \text{Equation (1)}$$

where k and i are positive integers indicating the $k^{th}$ frame and the $i^{th}$ frequency band of a frequency-domain signal corresponding to the error signal e(n). More specifically, e(k,i) is the power spectrum of the $k^{th}$ frame and $i^{th}$ frequency bin of the frequency-domain signal of e(n). $P_e(k,i)$ is the smoothed power of the $k^{th}$ frame and $i^{th}$ frequency bin, α is a smoothing factor having a value between 0.0 and 1.0.

The smoothed power of d(n) can be calculated in accordance with Equation (2):

$$P_d(k,i)=(1-\alpha) \times P_d(k-1,i)+\alpha \times d^2(k,i) \qquad \text{Equation (2)}$$

where d(k,i) is the amplitude of the $k^{th}$ frame and $i^{th}$ frequency band of the frequency-domain signal corresponding to the input audio signal d(n). $P_d(k,i)$ is the smoothed power of the $k^{th}$ frame and $i^{th}$ frequency band of the frequency domain signal. α is a smoothing factor having a value between 0.0 and 1.0.

The ratio R is based on the number or count C of the coefficients of the first adaptive filter 108 having absolute values above a given threshold. In the described embodiment, the ratio R is equal to the count C divided by the total number of filter coefficients (i.e., the tap length) of the first adaptive filter 108.

The actions 504 and 506 comprise determining whether the first adaptive filter 108 is diverging based on $P_e(n)$, $P_d(n)$, and R. The adaptive filter 108 is determined to be diverging or converging based on evaluation of Equations (3) and (4):

$$P_e(k,i)/P_d(k,i) > T_1 \qquad \text{Equation (3)}$$

$$R > T_2 \qquad \text{Equation (4)}$$

where $T_1$ is a threshold such as 1.01, and $T_2$ is a threshold such as 0.7. Equation (3) is evaluated for each frequency bin i of the frame k. If the condition is true for a sufficient period of time and for over a given number or percentage of frequency bins, such as for 24 milliseconds and for over half of the frequency bins, the first adaptive filter 108 is said to be diverging. Alternatively, the adaptive filter is said to be diverging if the condition of Equation (4) is satisfied. Otherwise, if neither of these conditions is satisfied, the first adaptive filter 108 is said to be converging.

FIG. 6 illustrates an example method 600 that may be performed by the echo path change detection (EPCD) component 116. An action 602 comprises calculating $P_e$ and $P_d$, the smoothed energies of e(n) and d(n), in accordance with Equations (1) and (2) above. The action 602 also comprises calculating a smoothed cross-power estimation between the audio input signal d(n) and the error signal e(n) in accordance with Equation (5):

$$P_{de}(k,i)=(1-\alpha) \times P_{de}(k-1,i)+\alpha \times d(k,i) \times e(k,i) \qquad \text{Equation (5)}$$

where $P_{de}(k,i)$ is the smoothed cross-power of the $k^{th}$ frame and $i^{th}$ frequency bin, $\alpha$ is a smoothing factor having a value between 0.0 and 1.0.

The actions 604 and 606 comprise determining whether an echo path change has occurred based on $P_e(k,i)$, $P_d(k,i)$, and $P_{de}(k,i)$. An echo path change is identified based on the following evaluations:

$$|P_e(k,i)-P_{de}(k,i)|/|P_d(k,i)-P_{de}(k,i)|>T_3 \quad \text{Equation (6)}$$

$$P_d(k,i)/P_e(k,i)>T_4 \quad \text{Equation (7)}$$

where $\|P_e(n)-P_{de}(n)\|$ is the absolute value of $P_e(n)-P_{de}(n)$, $|P_d(n)-P_{de}(n)|$ is the absolute value of $P_d(n)-P_{de}(n)$, $T_3$ is a threshold such as 0.01, and $T_4$ is a threshold such as 15.85. If either of these conditions is satisfied over a given percentage (such as 50%) of the frequency bins of a particular frame, it is said that there has been an observed or detected change in one or more echo paths. If both of these conditions are not satisfied over the given percentage of frequency bins, it is said that there has not been an observed or detected change in echo paths.

FIG. 7 illustrates an example method 700 that may be performed by the double talk detection (DTD) component 118. An action 702 comprises calculating $P_e$ and $P_d$, the smoothed powers of $e(n)$ and $d(n)$, in accordance with Equations (1) and (2) above. The action 702 also comprises calculating the smoothed cross-power estimation $P_{de}(n)$ between the audio input signal $d(n)$ and the error signal $e(n)$ in accordance with Equation (5), above.

The action 702 further comprises calculating a smoothed power estimation of the estimated 3estimated echo signal $y(n)$ in accordance with Equation (8):

$$P_y(k,i)=(1-\alpha)\times P_y(k-1,i)+\alpha \times y^2(k,i) \quad \text{Equation (8)}$$

The action 702 also comprises calculating a smoothed cross-power estimation between the input audio signal $d(n)$ and the estimated echo signal $y(n)$ in accordance with Equation (9):

$$P_d(k,i)=(1-\alpha)\times P_d(k-1,i)+\alpha \times d(k,i)\times y(k,i) \quad \text{Equation (9)}$$

An action 704 comprises evaluating various criteria to determine whether near-end user voice is present in the input audio signal. The criteria may be based at least in part on $P_e(n)$, $P_d(n)$, $P_y(n)$, $P_{de}(n)$, and $P_{dy}(n)$.

Equation (10) indicates an example criterion that may indicate near-end user voice signal in the input audio signal $d(n)$:

$$P_d(k,i)>P_e(k,i)>T_5\times P_d(k,i) \quad \text{Equation (10)}$$

where $T_5$ is a threshold with $0<T_5<1.0$ such as 0.88.

Equation (11) indicates another example criterion that may indicate the presence of near-end user voice in the input audio signal $d(n)$:

$$[P_{dy}(k,i)]^2<T_6\times P_d(k,i)\times P_y(k,i) \quad \text{Equation (11)}$$

where $0<T_6<1.0$. Equation (11) expresses a condition in which the cross-correlation coefficient between the microphone signal $d(n)$ and the estimated echo signal $y(n)$ is less than a given threshold. The presence of the condition expressed by Equation (11) for more than 50% of the frequency bins in a particular frame may be used as an indication of near-end audio in the input audio signal $d(n)$.

Equation (12) indicates another example criterion that may indicate the presence of near-end user voice in the input audio signal $d(n)$:

$$[P_{de}(k,i)]^2>T_7\times P_d(k,i)\times P_e(k,i) \quad \text{Equation (12)}$$

where $0<T_7<1.0$. Equation (12) expresses a condition in which the cross-correlation coefficient between the input audio signal $d(n)$ and error signal $e(n)$ is larger than a given threshold. The presence of the condition expressed by Equation (12) in more than 50% of the frequency bins of a particular frame may be used as an indication of near-end audio in the input audio signal $d(n)$.

Any one or more of Equations (10), (11), and (12) may be used in the action 704 as indications of near-end user voice or double-talk. In some cases, one or more of the conditions expressed by Equations (10), (11), and (12) may be used in combination, and near-end user voice may be detected based on a combination of these equations being evaluated as true. For example, near-end user voice may be detected based on the conditions of both of Equations (10) and (11) being satisfied. As another example, near-end user voice may be detected based on the conditions of both of Equations (10) and (12) being satisfied. As yet another example, detection of near-end user voice may be premised upon the presence of all of the conditions expressed by Equations (10), (11), and (12).

Although the description above assumes the availability of frequency domain values, the various evaluations may also be performed in the time domain. In the time domain, the power values may be calculated as below:

$$P_d(n)=(1-\beta)\times P_d(n-1)+\beta \times d^2(n) \quad \text{Equation (13)}$$

$$P_e(n)=(1-\beta)\times P_e(n-1)+\beta \times e^2(n) \quad \text{Equation (14)}$$

$$P_y(n)=(1-\beta)\times P_y(n-1)+\beta \times y^2(n) \quad \text{Equation (15)}$$

$$P_d(n)=(1-\beta)\times P_{dy}(n-1)+\beta \times d(n)\times y(n) \quad \text{Equation (16)}$$

$$P_{de}(n)=(1-\beta)\times P_{de}(n-1)+\beta \times d(n)\times e(n) \quad \text{Equation (17)}$$

where n represents the $n^{th}$ sample of the time-domain signal and $\beta$ is a smoothing factor between 0.0 and 1.0.

In the time domain, the equivalents of the conditions of Equations (10), (11), and (12) are as follows, respectively:

$$P_d(n)>P_e(n)>T_8\times Pd(n) \quad \text{Equation (18)}$$

$$[P_{dy}(n)]^2<T_9\times P_d(n)\times P_y(n) \quad \text{Equation (19)}$$

$$[P_{de}(n)]^2>T_{10}\times P_d(n)\times P_e(n) \quad \text{Equation (20)}$$

Figure 8:
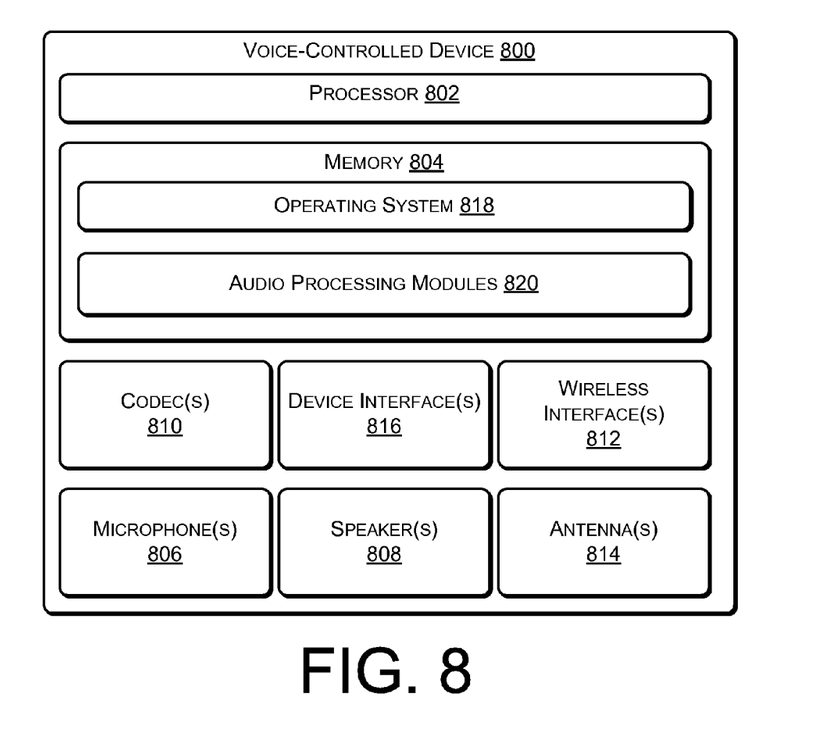
FIG. 8 is a block diagram illustrating an example system or device in which the techniques described herein may be implemented.

FIG. 8 shows an example of an audio system, element, or component that may be configured to perform adaptive echo cancellation in accordance with the techniques described above. In this example, the audio system comprises a voice-controlled device 800 that may function as an interface to an automated system. However, the devices and techniques described above may be implemented in a variety of different architectures and contexts. For example, the described echo cancellation may be used in various types of devices that perform audio processing, including mobile phones, entertainment systems, communications components, and so forth.

The voice-controlled device 800 may in some embodiments comprise a module that is positioned within a room, such as on a table within the room, which is configured to receive voice input from a user and to initiate appropriate actions in response to the voice input. In the illustrated implementation, the voice-controlled device 800 includes a processor 802 and memory 804. The memory 804 may include computer-readable storage media ("CRSM"), which may be any available physical media accessible by the processor 802 to execute instructions stored on the memory 804. In one basic implementation, CRSM may include random access memory ("RAM") and flash memory. In other implementations, CRSM may include, but is not limited to, read-only memory ("ROM"), electrically erasable programmable read-only memory ("EEPROM"), or any other medium which can be used to store the desired information and which can be accessed by the processor 802.

The voice-controlled device 800 includes a microphone unit that comprises one or more microphones 806 to receive audio input, such as user voice input. The device 800 also includes a speaker unit that includes one or more speakers 808 to output audio sounds. One or more codecs 810 are coupled to the microphone(s) 806 and the speaker(s) 808 to encode and/or decode audio signals. The codec(s) 810 may convert audio data between analog and digital formats. A user may interact with the device 800 by speaking to it, and the microphone(s) 806 captures sound and generates an audio signal that includes the user speech. The codec(s) 810 encodes the user speech and transfers that audio data to other components. The device 800 can communicate back to the user by emitting audible sounds or speech through the speaker(s) 808. In this manner, the user may interacts with the voice-controlled device 800 simply through speech, without use of a keyboard or display common to other types of devices.

In the illustrated example, the voice-controlled device 800 includes one or more wireless interfaces 812 coupled to one or more antennas 814 to facilitate a wireless connection to a network. The wireless interface(s) 812 may implement one or more of various wireless technologies, such as wifi, Bluetooth, RF, and so forth.

One or more device interfaces 816 (e.g., USB, broadband connection, etc.) may further be provided as part of the device 800 to facilitate a wired connection to a network, or a plug-in network device that communicates with other wireless networks.

The voice-controlled device 800 may be designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 800 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 800 does not use or need to use any input devices or displays in some instances.

Several modules such as instruction, datastores, and so forth may be stored within the memory 804 and configured to execute on the processor 802. An operating system module 818, for example, may be configured to manage hardware and services (e.g., wireless unit, Codec, etc.) within and coupled to the device 800 for the benefit of other modules. In addition, the memory 804 may include one or more audio processing modules 820, which may be executed by the processor 802 to perform the methods described herein, as well as other audio processing functions.

Although the example of FIG. 8 shows a programmatic implementation, the functionality described above may be performed by other means, including non-programmable elements such as analog components, discrete logic elements, and so forth. Thus, in some embodiments various ones of the components, functions, and elements described herein may be implemented using programmable elements such as digital signal processors, analog processors, and so forth. In other embodiments, one or more of the components, functions, or elements may be implemented using specialized or dedicated circuits. The term "component", as used herein, is intended to include any hardware, software, logic, or combinations of the foregoing that are used to implement the functionality attributed to the component.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
    a speaker;
    a microphone that captures sound from an environment including the speaker and generates an input audio signal;
    a first adaptive filter configured to dynamically update a plurality of first filter parameters and to produce a first estimated echo signal representing an echo component of an input audio signal, wherein the echo component is a result of audio propagating over one or more echo paths between the speaker and the microphone;
    an adaptation controller configured to:
        reset the first filter parameters to default;
        determine that the first adaptive filter is converging;
        determine that the one or more echo paths are stable;
        determine that a near-end user voice is detected in the input audio signal;
        stop the dynamically updating of the first filter;
    a second adaptive filter configured to
        receive the first filter parameters from the first adaptive filter, and
        produce a second estimated echo signal representing the echo component of the input audio signal based at least in part on the first filter parameters;
    an echo path change detection component configured to detect a change in the one or more echo paths based, at least in part, on one or more of a change in position of a user relative to the microphone, or a change in position of the speaker;
    a parameter update controller configured to update second filter parameters from the first filter parameters under one or more specified conditions, wherein at least one of the one or more specified conditions is based, at least in part, on the change in the one or more echo paths; and
    a subtraction component configured to subtract the second estimated echo signal from the input audio signal to produce an echo-suppressed audio signal.

2. The computing device of claim 1, wherein the first filter parameters are updated at an update rate, and wherein the adaptation controller is further configured to increase the update rate when both of the following conditions exist: (a) the first adaptive filter is not diverging and (b) one or more of the echo paths are changing.

3. The computing device of claim 1, further comprising evaluating the one or more specified conditions are based at least in part on one or more of the following:
   energy of the input audio signal;
   energy of an audio reference signal;
   energy of the echo-suppressed audio signal;
   energy of the first estimated echo signal; or
   energy of the second estimated echo signal.

4. The computing device of claim 1, wherein the one or more specified conditions are determined by:
   comparing an energy of the input audio signal to a first threshold;
   comparing an energy of an audio reference signal to a second threshold;
   comparing a relationship between an energy of the echo suppressed audio signal and an energy of an error signal to a third threshold; and
   comparing a relationship between the energy of the input audio signal and the energy of the error signal to a fourth threshold;
   wherein the error signal comprises a difference between the input audio signal and the first estimated echo signal.

5. A method, comprising:
   receiving an input audio signal having an echo component, wherein the echo component is a result of audio propagating over one or more echo paths between a speaker and a microphone;
   suppressing the echo component of the input audio signal to produce an echo-suppressed audio signal, wherein the suppressing is based at least in part on a plurality first filter parameters that are dynamically updated;
   detecting whether the first filter parameters are diverging;
   detecting whether a change has occurred in the one or more echo paths;
   detecting whether near-end audio is represented by the input audio signal;
   detecting that the first filter parameters are diverging;
   resetting the first filter; and
   determining that the one or more echo paths are stable based, at least in part, on one or more of a position of a user relative to the microphone, a change in position of the microphone, or a change in position of the speaker;
   stopping the dynamic updating of the first filter parameters.

6. The method of claim 5, further comprising estimating a first echo signal based at least in part on the first filter parameters and stopping the dynamic updating of the first filter parameters in response to detecting near-end audio represented by the input audio signal, the detecting the near-end audio represented by the input audio signal based at least in part on power of the input audio signal, power of the estimated first echo signal, and power of an error signal, the error signal comprises a difference between the input audio signal and the estimated first echo signal.

7. The method of claim 5, further comprising estimating a first echo signal based at least in part on the first filter parameters, wherein detecting whether a change has occurred in the one or more echo paths is based at least in part on power of the input audio signal and power of an error signal, and wherein the error signal comprises a difference between the input audio signal and the estimated first echo signal.

8. The method of claim 5, further comprising estimating a first echo signal with an adaptive finite impulse response filter by minimizing a power of an error signal, wherein the error signal comprises a difference between the input audio signal and the estimated first echo signal.

9. The method of claim 5, wherein the first filter parameters are updated at an update rate, the method further comprising increasing the update rate if the first filter parameters are diverging.

10. The method of claim 5, wherein the suppressing comprises:
    estimating an echo signal corresponding to the echo component of the input audio signal based at least in part on second filter parameters; and
    subtracting the estimated second echo signal from the input audio signal to produce the echo-suppressed audio signal.

11. The method of claim 10, wherein estimating the echo signal comprises filtering a received reference audio signal with an adaptive finite impulse respond filter to produce the echo signal.

12. The method of claim 5, wherein the suppressing comprises:
    estimating a first echo signal corresponding to the echo component of the input audio signal based at least in part on the first filter parameters;
    estimating a second echo signal corresponding to the echo component of the input audio signal based at least in part on second filter parameters;
    updating the second filter parameters by copying the first filter parameters under one or more specified conditions; and
    subtracting the second estimated echo signal from the input audio signal to produce the echo-suppressed audio signal.

13. The method of claim 12, further comprising evaluating the one or more specified conditions based at least in part on one or more of the following:
    energy of the input audio signal;
    energy of an output audio signal;
    energy of the echo-suppressed audio signal;
    energy of the estimated first echo signal; or
    energy of the estimated second echo signal.

14. The method of claim 12, further comprising evaluating the one or more specified conditions by:
    comparing an energy of the input audio signal to first threshold;
    comparing an energy of an output reference signal to a second threshold, wherein estimating the first and second echo signals is based at least in part on the output reference signal;
    comparing a relationship between an energy of the echo-suppressed audio signal and an energy of an error signal to a third threshold;
    comparing a relationship between an energy of the input audio signal and the energy of the error signal to a fourth threshold; and
    wherein the echo-suppressed audio signal comprises the input audio signal minus the estimated second echo signal and the error signal comprises the input audio signal minus the estimated first echo signal.

15. A system, comprising:
    one or more processors;
    a microphone;

a speaker;

memory storing computer-executable instructions that, when executed by one or more processors, cause the one or more processors to perform acts comprising:

estimating a first echo signal representing an echo component of an input audio signal by dynamically updating a plurality of first filter parameters and applying the first filter parameters to an audio reference signal, wherein the echo component is a result of audio propagating over an echo path between the speaker and the microphone;

estimating a second echo signal representing the echo component of the input audio signal by applying a plurality of second filter parameters to the audio reference signal; and updating the second filter parameters from the first of filter parameters under one or more specified conditions, wherein at least one of the one or more specified conditions is based, at least in part, on a change in position of a user relative to the microphone, or a change in position of the speaker.

16. The system of claim 15, wherein estimating the first echo signal and estimating the second echo signal are performed by first and second finite impulse response filters, respectively.

17. The system of claim 15, the acts further comprising evaluating the one or more specified conditions based at least in part on one or more of the following:

energy of the input audio signal;
energy of the audio reference signal;
energy of the estimated first echo signal; or
energy of the estimated second echo signal.

18. The system of claim 15, the acts further comprising evaluating the one or more specified conditions by:

comparing an energy of the input audio signal to first threshold;

comparing an energy of the audio reference signal to a second threshold;

comparing a relationship between an energy of an echo suppressed audio signal and an energy of an error signal to a third threshold; and comparing a relationship between an energy of the input audio signal and the energy of the error signal to a fourth threshold;

wherein the echo-suppressed audio signal comprises the input audio signal minus the estimated second echo signal and the error signal comprises the input audio signal minus the estimated first echo signal.

19. The system of claim 15, the acts further comprising:

stopping the dynamic updating of the first filter parameters in response to divergence of the first filter parameters; and stopping the dynamic updating of the first filter parameters when both of the following conditions exist: (a) echo path changes have not occurred, and (b) near-end audio is represented by the input audio signal.

20. The system of claim 15, the acts further comprising:

resetting the first filter parameters in response to divergence of the first filter parameters; and stopping the dynamic updating of the first filter parameters when all of the following conditions exist: (a) the first filter parameters are not diverging, (b) echo path changes have not occurred, and (c) near-end audio is represented by the input audio signal.

* * * * *